J. W. BRANSON.
METAL SHEARING MACHINE.
APPLICATION FILED NOV. 19, 1912.

1,073,583.

Patented Sept. 16, 1913.

2 SHEETS—SHEET 1.

Witnesses
J. P. Wohler
Harry M. Test

Inventor,
J. W. Branson,
By Crandle Crandle
Attorneys.

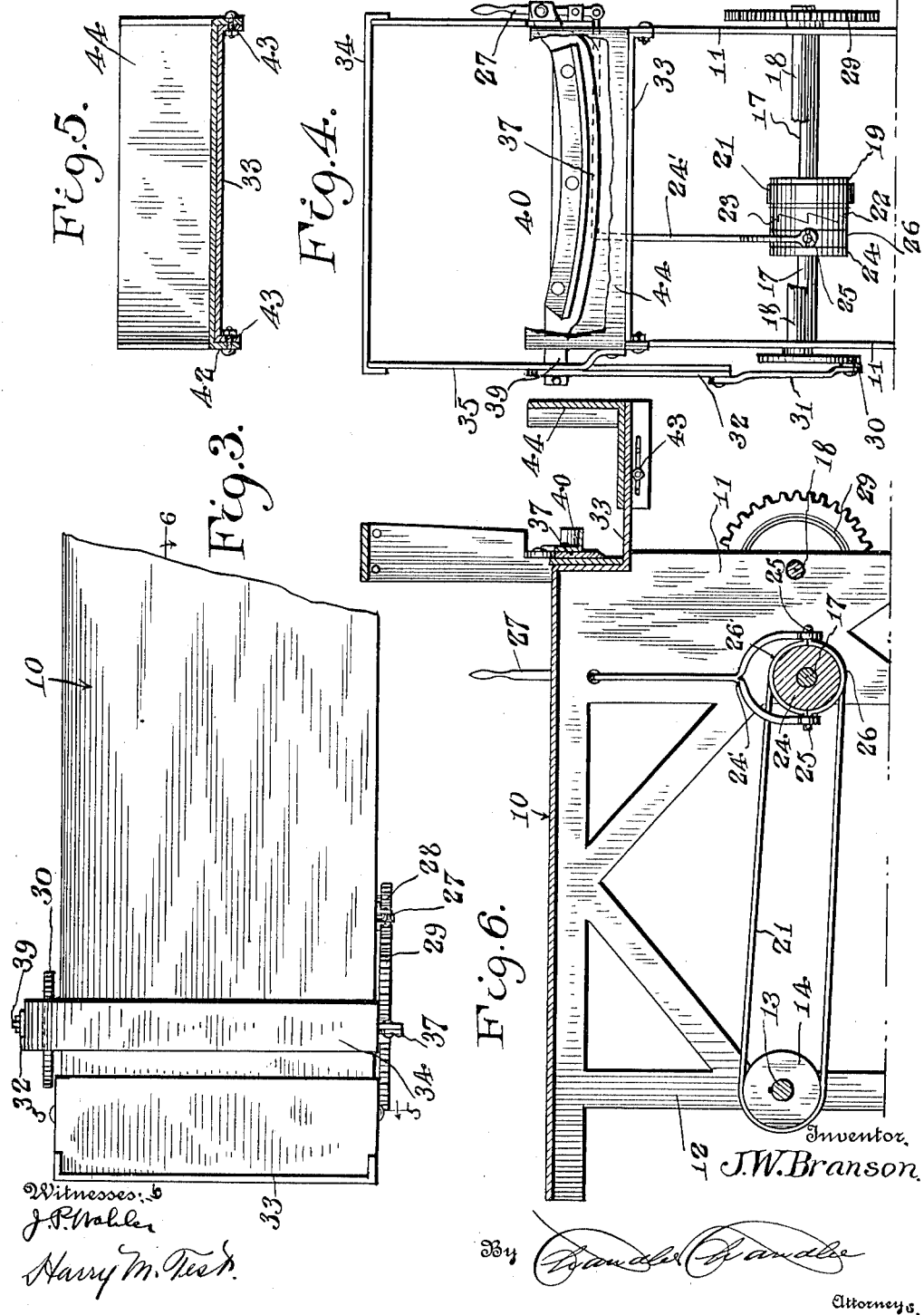

UNITED STATES PATENT OFFICE.

JOHN W. BRANSON, OF WALLACE, VIRGINIA.

METAL-SHEARING MACHINE.

1,073,583.  Specification of Letters Patent.  Patented Sept. 16, 1913.

Application filed November 19, 1912. Serial No. 732,398.

*To all whom it may concern:*

Be it known that I, JOHN W. BRANSON, a citizen of the United States, residing at Wallace, in the county of Washington, State of Virginia, have invented certain new and useful Improvements in Metal-Shearing Machines; and I do hereby declare the following to be a full, clear, and exact description of the invention, such as will enable others skilled in the art to which it appertains to make and use the same.

This invention relates to improvements in metal shearing machines.

The principal object of the invention is to provide a simple machine of this character for measuring and cutting sheet or bar metals.

Another object is to provide a novel form of cutter blade.

Other objects and advantages will be apparent from the following description and with particular reference to the accompanying drawings.

Figure 1:
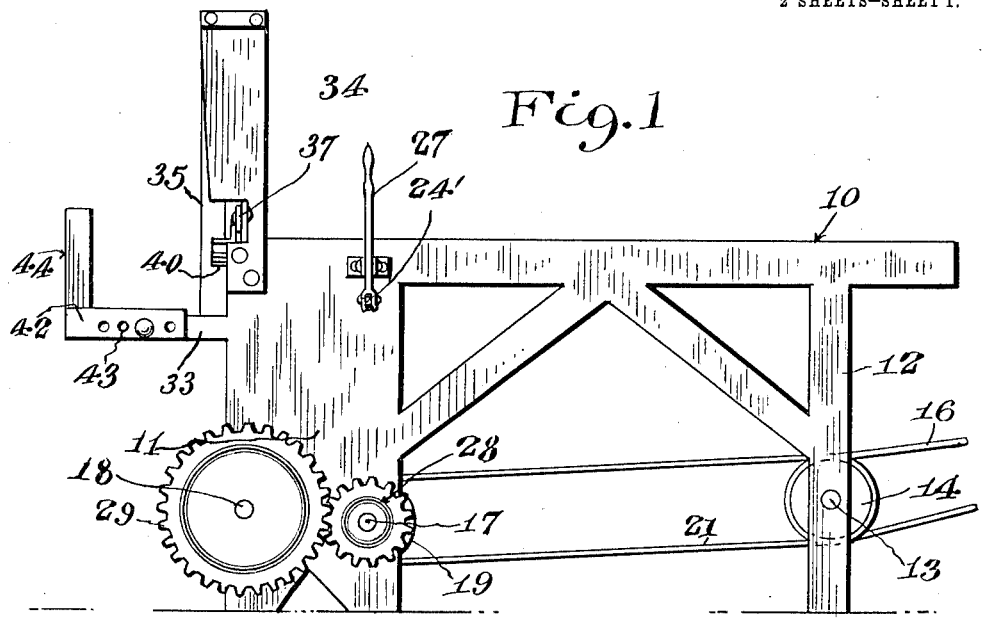
Figure 2:
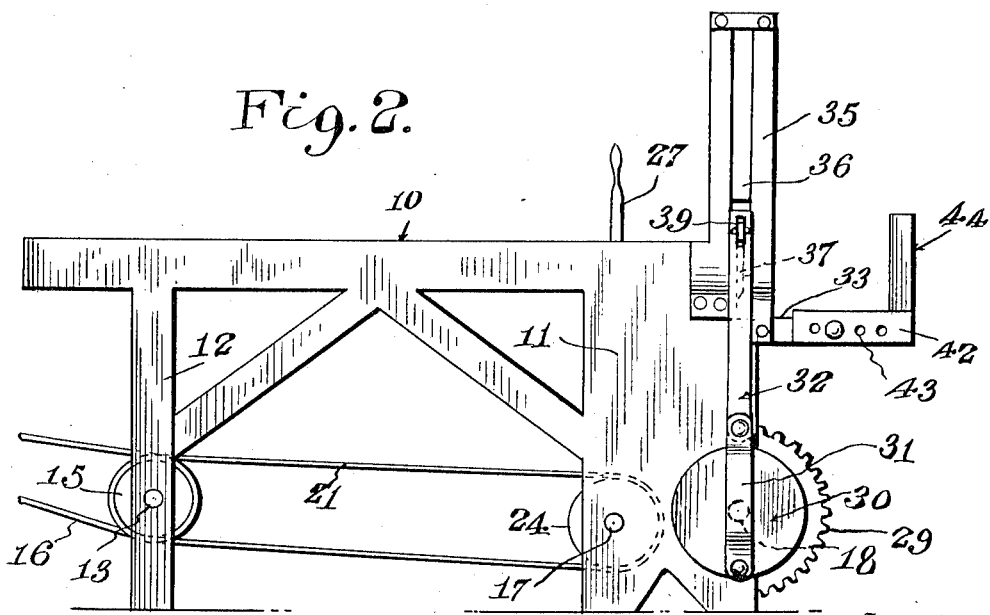

In the drawings: Figure 1 is a side elevation of my shearing machine, Fig. 2 is a similar view taken from the other side of the machine, Fig. 3 is a top plan view, Fig. 4 is a front elevation, Fig. 5 is a vertical transverse sectional view on the line 5—5 of Fig. 3, Fig. 6 is a vertical longitudinal view on the line 6—6 of Fig. 3.

Referring particularly to the drawings, 10 represents a table supported by the legs 11 and 12. Journaled in the legs 12 is a transverse power transmitting shaft 13, carrying thereon the pulleys 14 and 15, the latter of which receives power by means of a belt 16 from a power shaft, not shown. The legs 11 are considerably wider than the legs 12, and have journaled therein the shafts 17 and 18. On the shaft 17 is a pulley 19 which receives power from the rear shaft by means of the belt 21. On one side face of the pulley 19 are clutch teeth 22 which are adapted to be engaged by the similarly formed clutch teeth 23 on a slidable clutch member 24, a pulley 19 being loosely mounted on the shaft 17. A bifurcated lever 24' is connected to a lug 25 of a collar 26 mounted in a groove 28' on a slidable clutch member 24, a handle 27 being arranged on one end of the lever so that the clutch member 24 may be moved into and out of engagement with the teeth of the pulley 19. On one end of the shaft 17 is a small pinion 28 which is in mesh with a larger pinion 29 on the same end of the shaft 18. This transmits motion to the shaft 18. On the opposite end of the shaft 18 is a crank disk 30, which carries a connecting link 31 pivotally connected to a cross head 32.

Mounted on the end of the table is a work receiving and measuring platform 33 which is slightly below the adjacent end of the table 10 and on to which the work which has been cut will drop. A vertical frame 34 is mounted on the last-mentioned end of the table, and in one of the side uprights 35 of the frame is formed a slot 36 in which slides the before-mentioned cross head. Pivotally connected to the other upright of the frame is a curved knife 37. The opposite end of this knife is provided with a handle 39 which is adapted to be attached to the upper end of the cross head, so that by means of the cross head the knife may be reciprocated by motive power, and by detachment of the cross head the knife may be manually operated. Secured to the outer face of the curved knife is an angle plate 40 which is curved longitudinally to conform to the curvature of the cutting blade.

A platform is mounted on the bracket 42 and is adjustable toward and away from the table by means of the bolt and slot connections 43, a vertical stop flange 44 being formed on the outer end of the platform, against which the metal sheets which are placed on the table may be engaged against so as to be cut off by the knife.

What is claimed is:

In a sheet metal shearing machine, a table, a measuring gage stop and work support on one end of the table, a longitudinally curved knife pivotally connected at one end on to the table, a vertically reciprocating cross head mounted on the other side of the table, means for reciprocating the cross head, a curved angular guard plate, secured on the blade, and means for connecting one end of the blade to the cross head.

In testimony whereof, I affix my signature, in presence of two witnesses.

JOHN W. BRANSON.

Witnesses:
 O. A. BUTLER,
 H. J. BOOKER.

Copies of this patent may be obtained for five cents each, by addressing the "Commissioner of Patents, Washington, D. C."